US012500621B2

(12) United States Patent
Kao et al.

(10) Patent No.: US 12,500,621 B2
(45) Date of Patent: Dec. 16, 2025

(54) METHOD FOR ADJUSTING TRANSMITTING POWER RATIO OF RADIO MODULE AND ASSOCIATED RADIO SYSTEM

(71) Applicant: MEDIATEK INC., Hsin-Chu (TW)

(72) Inventors: Fu-Tse Kao, Hsinchu (TW); Yi-Hsuan Lin, Hsinchu (TW); Han-Chun Chang, Hsinchu (TW); Yi-Ying Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 442 days.

(21) Appl. No.: 18/136,333

(22) Filed: Apr. 18, 2023

(65) Prior Publication Data

US 2023/0387955 A1    Nov. 30, 2023

Related U.S. Application Data

(60) Provisional application No. 63/347,050, filed on May 31, 2022.

(51) Int. Cl.
*H04W 52/24* (2009.01)
*H04B 1/3827* (2015.01)
*H04W 52/22* (2009.01)
*H04W 52/36* (2009.01)

(52) U.S. Cl.
CPC ........ *H04B 1/3838* (2013.01); *H04W 52/221* (2013.01); *H04W 52/24* (2013.01); *H04W 52/367* (2013.01)

(58) Field of Classification Search
CPC ... H04B 1/3827; H04B 1/3838; H04W 52/22; H04W 52/221; H04W 52/36; H04W 52/367; H04W 52/24
See application file for complete search history.

(56) References Cited

U.S. PATENT DOCUMENTS

| | | | | |
|---|---|---|---|---|
| 8,243,848 | B2 * | 8/2012 | Ohwatari | H04W 52/42 375/295 |
| 9,986,511 | B2 * | 5/2018 | Yang | H04W 52/146 |
| 10,924,146 | B2 * | 2/2021 | Kaidar | H04W 52/367 |
| 11,228,987 | B2 * | 1/2022 | Krenz | H04W 52/34 |
| 11,716,695 | B2 * | 8/2023 | Curtiss | H04W 52/367 455/522 |

(Continued)

FOREIGN PATENT DOCUMENTS

| | | | | |
|---|---|---|---|---|
| CA | 3045510 | A1 * | 6/2018 | H04W 52/283 |
| EP | 1709761 | B1 * | 6/2017 | H04L 1/0003 |

(Continued)

*Primary Examiner* — Hai V Nguyen
(74) *Attorney, Agent, or Firm* — Winston Hsu

(57) ABSTRACT

A method for adjusting a transmitting (TX) power ratio of a radio module includes: separating multiple radio modules into multiple radio groups according to a radiofrequency (RF) regulation, wherein the multiple radio modules comprise the radio module; mapping an RF exposure limit to a TX power limit; interacting with at least one other radio module for adjusting the TX power ratio, to obtain at least one adjusted TX power ratio, wherein the radio module and the at least one other radio module are comprised in a same radio group of the multiple radio groups; and adjusting the TX power limit according to the at least one adjusted TX power ratio, to generate an adjusted TX power limit of the radio module.

30 Claims, 6 Drawing Sheets

(56) References Cited

U.S. PATENT DOCUMENTS

| | | | |
|---|---|---|---|
| 11,901,984 B2* | 2/2024 | Kotilainen | H01Q 3/24 |
| 11,917,559 B2* | 2/2024 | Nadakuduti | H04B 1/3838 |
| 12,323,961 B2* | 6/2025 | Nadakuduti | H04W 52/346 |
| 12,369,129 B2* | 7/2025 | Va | H04W 52/223 |
| 2010/0272211 A1* | 10/2010 | Ohwatari | H04W 52/42 375/267 |
| 2014/0203960 A1* | 7/2014 | Huang | G01S 7/034 342/175 |
| 2017/0013563 A1* | 1/2017 | Yang | H04W 52/146 |
| 2018/0175944 A1* | 6/2018 | Seyed | H04B 1/3833 |
| 2019/0349017 A1* | 11/2019 | Kaidar | H04W 52/44 |
| 2021/0321340 A1* | 10/2021 | Krenz | H04W 72/0473 |
| 2022/0116949 A1* | 4/2022 | Nadakuduti | H04W 72/0473 |
| 2022/0224385 A1* | 7/2022 | Kotilainen | G01S 1/042 |
| 2023/0080162 A1* | 3/2023 | Ghanbarinejad | H04W 52/46 455/522 |
| 2023/0122075 A1* | 4/2023 | Lin | H04W 52/42 370/329 |
| 2023/0362836 A1* | 11/2023 | Chang | H04W 52/367 |
| 2025/0119173 A1* | 4/2025 | Kao | H04W 52/367 |
| 2025/0119841 A1* | 4/2025 | Yu | H04W 52/241 |

FOREIGN PATENT DOCUMENTS

| | | | | |
|---|---|---|---|---|
| WO | WO-2018112430 A1 * | 6/2018 | | H04W 52/367 |
| WO | WO-2021029532 A1 * | 2/2021 | | H04W 52/28 |

* cited by examiner

METHOD FOR ADJUSTING TRANSMITTING POWER RATIO OF RADIO MODULE AND ASSOCIATED RADIO SYSTEM

CROSS REFERENCE TO RELATED APPLICATIONS

This application claims the benefit of U.S. Provisional Application No. 63/347,050, filed on May 31, 2022. The content of the application is incorporated herein by reference.

BACKGROUND

The present invention is related to radiofrequency (RF) technology, and more particularly, to a method for adjusting a transmitting (TX) power ratio of a radio module and an associated radio system.

Nowadays, the RF technology has often appeared in a user equipment (UE; such as a mobile phone). However, excessive RF exposure may cause harm to human body. As a result, officials of different countries (e.g. federal communications commission (FCC) of USA, innovation, science, and economic development (ISED) of Canada, and conformite europeenne (CE) of Europe) regulate a time-averaged RF exposure limit to limit a time-averaged RF exposure of a radio module in the UE. For example, in response to a frequency band of the radio module being smaller than 6 GHz, the time-averaged RF exposure will be quantified with a time-averaged specific absorption rate (SAR), and in response to the frequency band of the radio module being not smaller than 6 GHz, the time-averaged RF exposure will be quantified with a time-averaged power density (PD). In addition, since the time-averaged RF exposure will be proportional to a TX power of the radio module, the time-averaged RF exposure can meet the time-averaged RF exposure limit by controlling the TX power.

For simultaneous multi-radio access technology (multi-RAT) transmission (e.g. 2G, 3G, 4G, FR1, FR2, wireless fidelity (Wi-Fi), and Bluetooth (BT)), the officials regulate that a total exposure ratio (TER) must be less than or equal to 1 (i.e. TER≤1). How to properly allocate the TX power of multiple radio modules in the UE to meet regulations and performance requirements at the same time has become an important issue. For a conventional TX power allocation method, all of the radio modules may be regarded as a single radio group, and all of RF exposure caused by the radio modules in the single radio group is combined to calculate the TER of the single radio group, which makes the individual radio modules difficult to comply with the TER regulation. In addition, only the maximum available TX power ratio is allocated to the radio modules with a predetermined fixed ratio. The disadvantage is that even if any of the radio modules only needs a TX power ratio less than the predetermined fixed ratio (i.e. one radio module will have a TX power margin remained unused), the others of the radio modules may not be able to utilize the TX power margin, which will reduce ratio efficiency and performance. As a result, a novel method for adjusting a TX power ratio of a radio module and an associated radio system are urgently needed.

SUMMARY

It is therefore one of the objectives of the present invention to provide a method for adjusting a TX power ratio of a radio module, which separates multiple radio modules into multiple radio groups according to an RF regulation related to the SPLSR for calculating respective TER of the radio groups, and an associated radio system, to address the above-mentioned issues.

According to an embodiment of the present invention, a method for adjusting a TX power ratio of a radio module is provided. The method comprises: separating multiple radio modules into multiple radio groups according to an RF regulation, wherein the multiple radio modules comprise the radio module; mapping an RF exposure limit to a TX power limit; interacting with at least one other radio module for adjusting the TX power ratio, to obtain at least one adjusted TX power ratio, wherein the multiple radio modules comprise the at least one other radio module, and the radio module and the at least one other radio module are comprised in a same radio group of the multiple radio groups; and adjusting the TX power limit according to the at least one adjusted TX power ratio, to generate an adjusted TX power limit of the radio module.

According to an embodiment of the present invention, a radio system for adjusting a TX power ratio of a radio module is provided. The radio system comprises a processing circuit and the radio module. The processing circuit is arranged to separate multiple radio modules into multiple radio groups according to an RF regulation, wherein the multiple radio modules comprise the radio module. The radio module is arranged to: map an RF exposure limit to a TX power limit; interact with at least one other radio module for adjusting the TX power ratio, to obtain at least one adjusted TX power ratio, wherein the radio module and the at least one other radio module are comprised in a same radio group of the multiple radio groups; and adjust the TX power limit according to the at least one adjusted TX power ratio, to generate an adjusted TX power limit of the radio module.

One of the benefits of the present invention is that, by the method of the present invention and an associated radio system, multiple radio modules are separated into multiple radio groups according to an RF regulation related to the SPLSR for calculating respective TER of the radio groups, which can make the radio groups easy to comply with the TER regulation, and therefore can increase design flexibility. In addition, for each radio group, in the beginning, under a condition that any of the radio modules in the radio group only needs a TX power ratio less than a predetermined fixed ratio (i.e. one radio module will have a TX power margin remained unused), the others of the radio modules in the radio group may be able to utilize the TX power margin for dynamically adjusting the TX power ratios of the others of the multiple radio modules and the TX power ratio of the any of the multiple radio modules (e.g. increasing the TX power ratios of the others of the multiple radio modules and correspondingly decreasing the TX power ratio of the any of the multiple radio modules). Afterwards, under a condition that the any of multiple radio modules still only needs a current TX power ratio less than a previous adjusted TX power ratio (i.e. the one radio module will still have the TX power margin remained unused), the others of the multiple radio modules may be able to utilize the TX power margin for further dynamic adjustment. In this way, ratio efficiency and performance can be improved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .".

Figure 1:
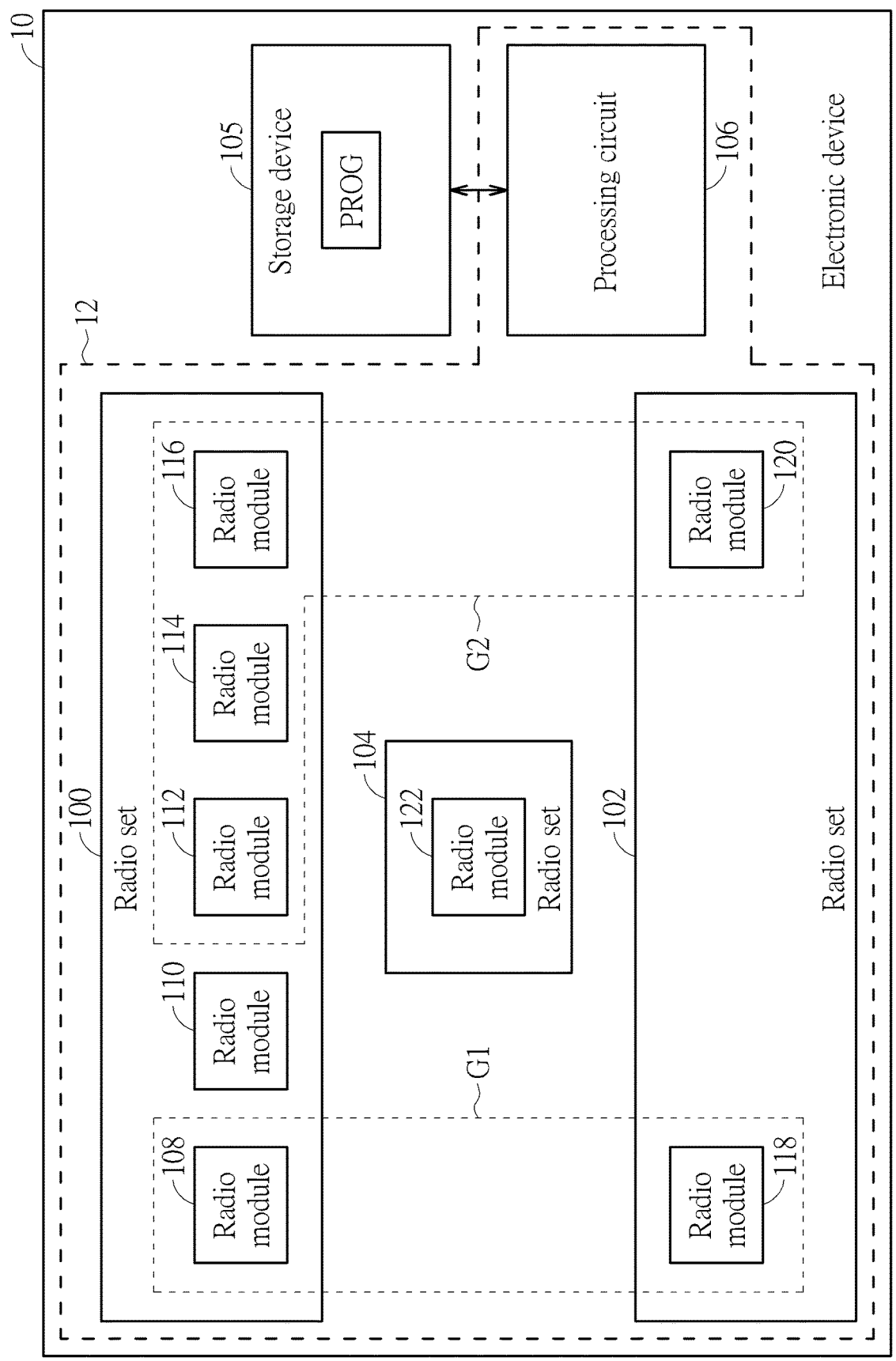
FIG. 1 is a diagram illustrating an electronic device according to an embodiment of the present invention.

FIG. 1 is a diagram illustrating an electronic device 10 according to an embodiment of the present invention. Byway of example, but not limitation, the electronic device 10 may be a portable device such as a smartphone, a wearable device, or a tablet. As shown in FIG. 1, the electronic device 10 may include a radio system 12 and a storage device 105, wherein the radio system 12 may include multiple radio sets 100, 102, and 104 and a processing circuit 106, the radio set 100 may include multiple radio modules 108, 110, 112, 114, and 116, the radio set 102 may include multiple radio modules 118 and 120, and the radio set 104 may include a radio module 122. Each of the radio modules 108, 110, 112, 114, 116, 118, 120, and 122 may include communication circuits corresponding to sub-6, millimeter wave (mmWave), Wi-Fi, BT, Zigbee, global positioning system (GPS), vehicle to everything (V2X), and/or non-terrestrial networks (NTN), but the present invention is not limited thereto. For example, the radio set 100 may be a cellular radio set corresponding to sub-6 (i.e. the radio modules 108, 110, 112, 114, and 116 include communication circuits corresponding to sub-6). The radio set 102 may be a cellular radio set corresponding to mmWave (i.e. the radio modules 118 and 120 include communication circuits corresponding to mmWave). The radio set 104 may be a connectivity system radio set corresponding to Wi-Fi and/or BT (i.e. the radio module 122 includes communication circuits corresponding to Wi-Fi and/or BT).

The processing circuit 106 may be a single-core processor or a multi-core processor. The storage device 105 is a non-transitory machine-readable medium, and is arranged to store computer program code PROG. The electronic device 10 may be regarded as a computer system using a computer program product that includes a computer-readable medium containing the computer program code PROG. The processing circuit 106 is equipped with software execution capability. When loaded and executed by the processing circuit 106, the computer program code PROG instructs the processing circuit 106 to separate multiple radio sets (e.g. the radio sets 100, 102, and 104) into multiple radio groups according to a radiofrequency (RF) regulation, wherein the RF regulation is related to a specific absorption rate (SAR) to peak location separation ratio (SPLSR). Specifically, an SPLSR equation is expressed as follows:

$$\left(\frac{SAR_1 + SAR_2}{R}\right)^{1.5}$$

wherein "$SAR_1$" represents the SAR of a radio module, "$SAR_2$" represents the SAR of another radio module, and "R" is a separation distance between a peak SAR location of the radio module and a peak SAR location of the another radio module.

For 1 g SAR, the SPLSR equation is regulated to be less than or equal to 0.04

$$\text{(i.e. } \left(\frac{SAR_1 + SAR_2}{R}\right)^{1.5} \leq 0.04\text{).}$$

For 10 g SAR, the SPLSR equation is regulated to be less than or equal to 0.1

$$\text{(i.e. } \left(\frac{SAR_1 + SAR_2}{R}\right)^{1.5} \leq 0.1\text{).}$$

Under a condition that any radio module in a radio group and any radio module in another radio group satisfy the above-mentioned regulations of the SPLSR, a total exposure ratio (TER) calculation of the radio group and a TER calculation of the another radio group can be independent.

In this embodiment, the processing circuit 106 may separate the radio sets 100 and 102 into multiple radio groups G1 and G2 according to the regulations of the SPLSR, and more particularly, may separate the radio module 108 included in the radio set 100 and the radio module 118 included in the radio set 102 into the radio group G1, and separate the radio modules 112, 114, and 116 in the radio set 100 and the radio module 120 in the radio set 102 into the radio group G2. Since any radio module in the radio group G1 and any radio module in the radio group G2 (e.g. the radio module 108 and the radio 112) satisfy the above-mentioned regulations of the SPLSR, the TER calculation of the radio group G1 and the TER calculation of the radio group G2 can be independent. That is, a sum of the TER of any radio module(s) in the radio group G1 and the TER of any radio module(s) in the radio group G2 can be greater than 1. For example, a sum of the TER of the radio module 108 in the radio group G1 and the TER of the radio module 112 in the radio group G2 can be greater than 1.

However, the radio group separation in this embodiment is for illustrative purposes only, and is not meant to be as a limitation of the present invention. In some embodiments, the processing circuit 106 may separate the radio sets 100 and 104 into a radio group according to the regulations of the SPLSR, and more particularly, may separate the radio modules 110 and 112 included in the radio set 100 and the radio module 122 included in the radio set 104 into the radio group. In some embodiments, the processing circuit 106 may separate the radio sets 102 and 104 into a radio group according to the regulations of the SPLSR, and more particularly, may separate the radio module 118 included in the radio set 102 and the radio module 122 included in the radio set 104 into the radio group. These alternative designs all fall within the scope of the present invention.

In addition, a plurality of indicators can be utilized to identify the radio groups G1 and G2 between the radio sets 100 and 102.

TABLE 1

|  |  | Radio set 100 | | | | |
| --- | --- | --- | --- | --- | --- | --- |
|  |  | Radio module 108 | Radio module 110 | Radio module 112 | Radio module 114 | Radio module 116 |
| Radio set 102 | Radio module 118 | #a1 | | | | |
|  | Radio module 120 | | | #a2 | #a2 | #a2 |

Table 1 illustrates an example of indicators #a1 and #a2 utilized to identify the radio groups G1 and G2 between the radio sets 100 and 102, wherein the indicator #a1 indicates that the radio module 108 in the radio set 100 and the radio module 118 in the radio set 102 are in the radio group G1, and the indicators #a2 indicate that the radio modules 112, 114, and 116 in the radio set 100 and the radio module 120 in the radio set 102 are in the radio group G2.

Figure 2:
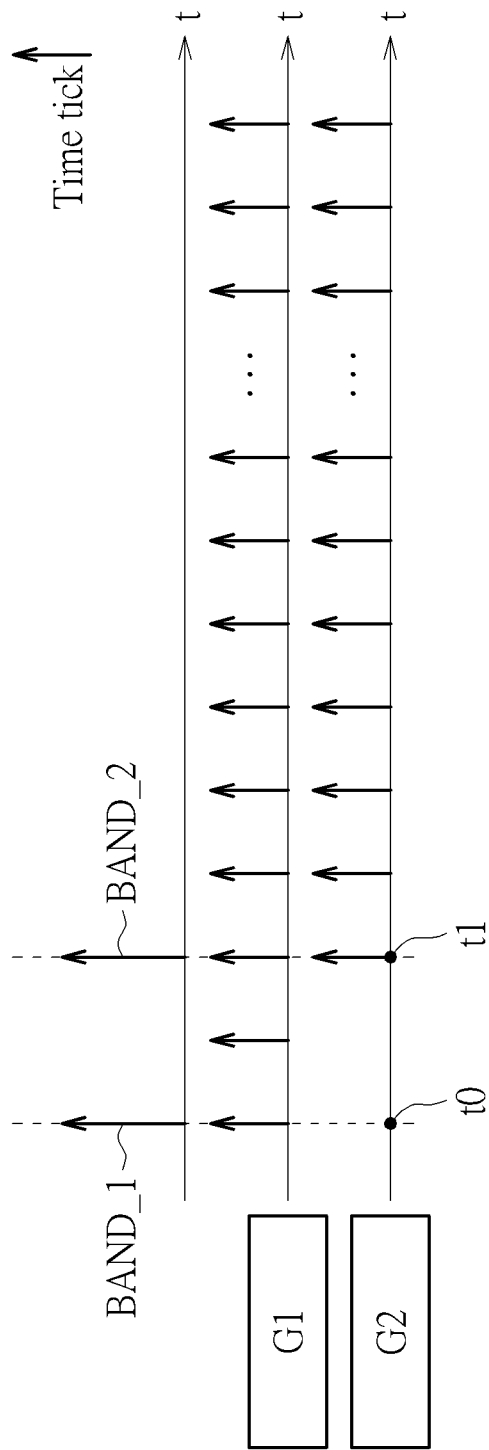
FIG. 2 is a timing diagram of activation of time ticks of multiple radio groups according to an embodiment of the present invention.

In addition, for each of the radio groups G1 and G2, the processing circuit 106 may be further arranged to start to activate a time tick corresponding to the each of the radio groups G1 and G2 according to one or more configurations corresponding to the each of the radio groups G1 and G2, for calculating respective TERs. By way of example, but not limitation, the one or more configurations may be related to at least one of an antenna, a band, a beam, a technology, a sub-band, one or more exposure condition indices, a simultaneous transmitted state, a mobile country code (MCC), a mobile network code (MNC), a modulation, a bandwidth, a maximum power reduction (MPR), a path, a duty cycle, and a combination of the band and a subscriber identity module (SIM). In detail, please refer to FIG. 2. FIG. 2 is a timing diagram of activation of time ticks of the radio groups G1 and G2 according to an embodiment of the present invention. In this embodiment, the one or more configurations are related to the band. As shown in FIG. 2, at a time point t0, a band BAND_1 of the radio group G1 is activated. At this moment, the processing circuit 106 may be arranged to start to activate a time tick corresponding to the radio group G1 for calculating the TER of the radio group G1. At a time point t1, a band BAND_2 of the radio group G2 is activated. At this moment, the processing circuit 106 may be arranged to start to activate a time tick corresponding to the radio group G2 for calculating the TER of the radio group G2. In this way, the TER calculation of the radio group G1 and the TER calculation of the radio group G2 are independent.

Figure 3:
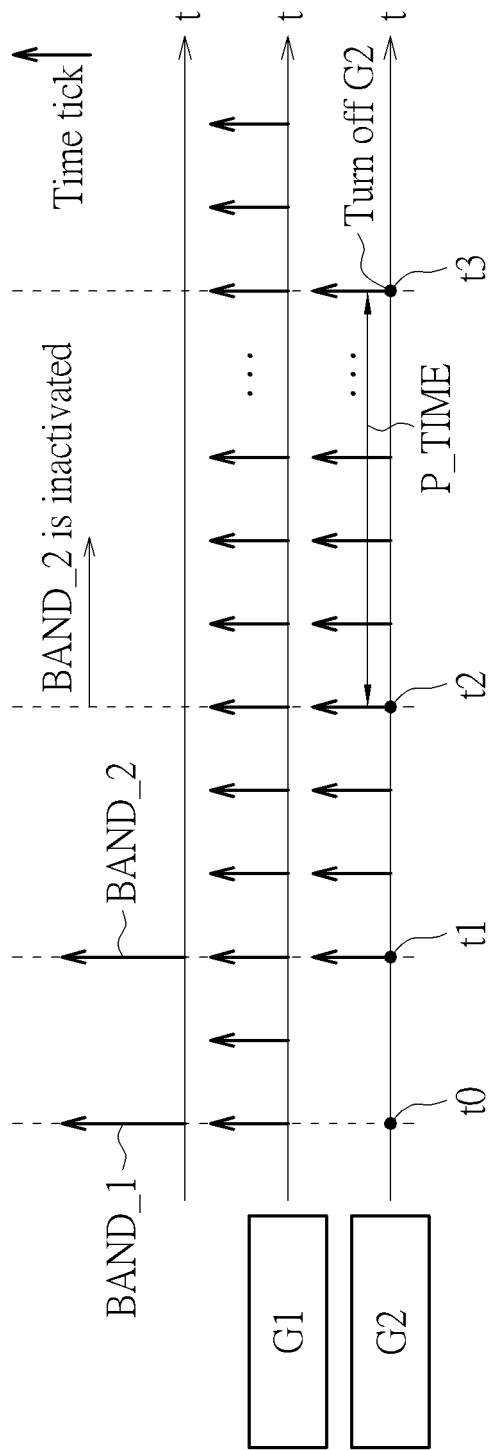
FIG. 3 is a timing diagram of activation of time ticks of multiple radio groups according to another embodiment of the present invention.

FIG. 3 is a timing diagram of activation of time ticks of the radio groups G1 and G2 according to another embodiment of the present invention. The difference between the timing diagram shown in FIG. 2 and the timing diagram shown in FIG. 3 is that the band BAND_2 of the radio group G2 is inactivated for at least a period of time in the timing diagram shown in FIG. 3. For example, the band BAND_2 of the radio group G2 is inactivated since a time point t2, and after the period of time (e.g. from the time point t2 to a time point t3; for brevity, labeled as "P_TIME" in FIG. 3) has elapsed, the processing circuit 106 may be arranged to start to inactivate the time tick corresponding to the radio group G2 (e.g. turnoff the radio group G2) at the time point t3, to stop calculating the TER of the radio group G2.

Figure 4:
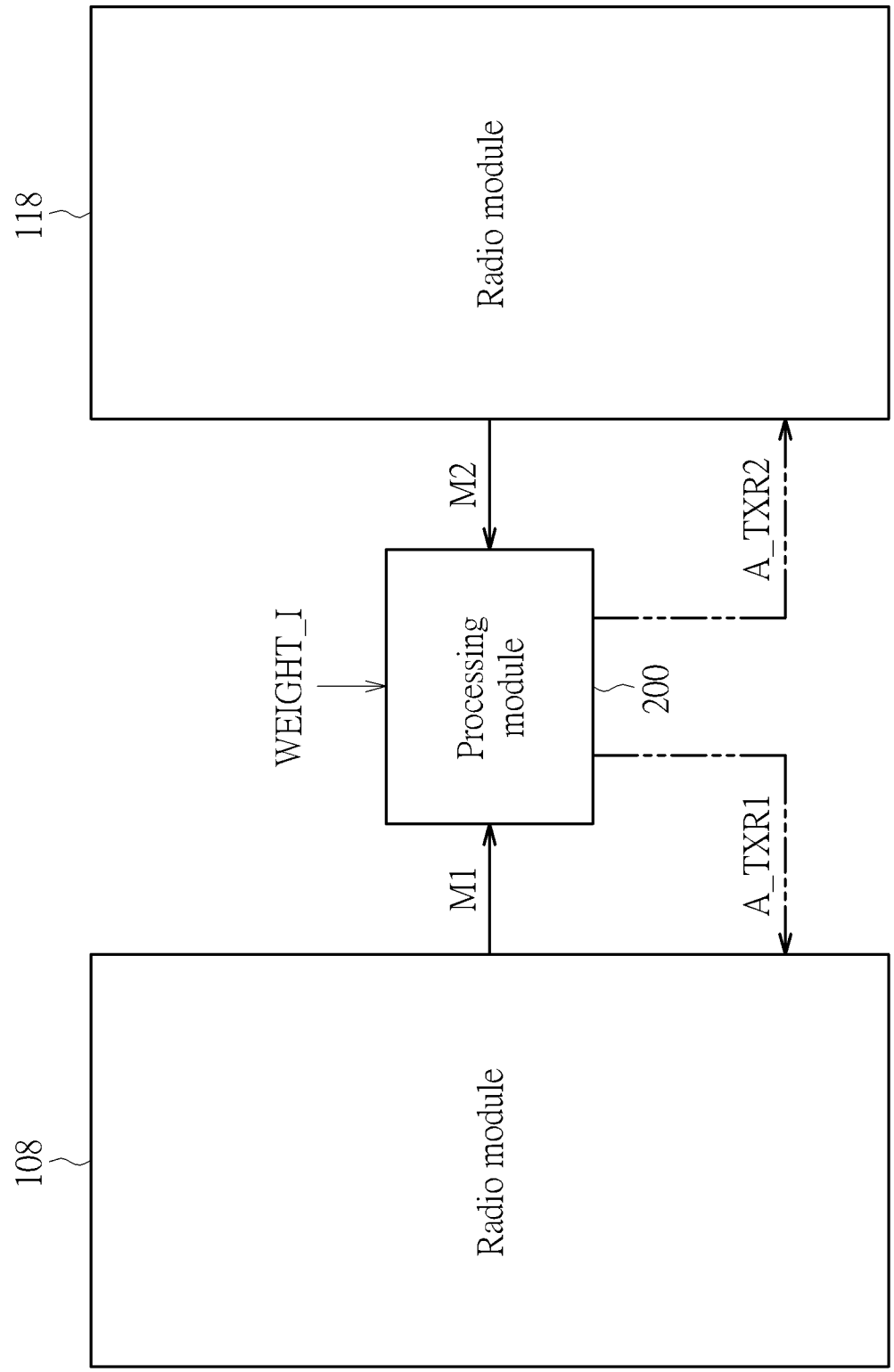
FIG. 4 is a diagram illustrating an adjustment scheme between two radio modules in a same radio group according to an embodiment of the present invention.

FIG. 4 is a diagram illustrating an adjustment scheme between multi radio modules in a same radio group according to an embodiment of the present invention. For better comprehension, the radio group G1 including the radio modules 108 and 118 in FIG. 1 is taken as an example. As shown in FIG. 4, a processing module 200 may include circuits arranged to receive weighting information WEIGHT_I from a user or different scenarios for allocating a TX power ratio TXR1 of the radio module 108 and a TX power ratio TXR2 of the radio module 118. For example, the weighting information WEIGHT_I may be predetermined fixed ratios for the TX power ratios TXR1 and TXR2 from the user or the different scenarios. It should be noted that the processing module 200 may be implemented by one of the radio modules 108 and 118 (i.e. the processing module 200 can be a part of the radio module 108 or the radio module 118), and the processing module 200 may be further arranged to interact with the other of the radio modules 108 and 118 to receive at least one message from the other of the radio modules 108 and 118, for dynamically adjusting the TX power ratios TXR1 and TXR2. In this embodiment, the dynamic adjustment of the TX power ratio is performed between two radio modules in a same radio group (e.g. the radio modules 108 and 118 included in the radio group G1). However, this is for illustrative purposes only, and is not meant to be as a limitation of the present invention. In some embodiments, the dynamic adjustment of the TX power ratio can be performed between more than two radio modules (e.g. the radio modules 112, 114, 116, and 120 included in the radio group G2). In practice, any radio module that is capable of interacting with at least one other radio module in the same radio group to receive at least one message, and dynamically adjusting the TX power ratio of any radio module at least according to the at least one message, can be employed by the processing module 200. These alternative designs all fall within the scope of the present invention.

In this embodiment, the radio module 108 may be arranged to receive a time-averaged RF exposure limit regulated by officials (for brevity, hereinafter denoted by "RF exposure limit"), wherein the RF exposure limit corresponds to the radio module 108. Since the RF exposure limit is proportional to a TX power of the radio module 108, the radio module 108 may be further arranged to map the RF exposure limit to a TX power limit TPL1 of the radio module 108. Specifically, the RF exposure limit may be a total exposure ratio (TER), wherein the TER may include a normalized average specific absorption rate (SAR) limit and a normalized average power density (PD) limit, and the TER is required to be less than or equal to 1 (i.e. TER≤1). The radio module 108 may utilize a test or a simulation to find a first normalized average TX power limit mapped to the normalized average SAR limit and a second normalized average TX power limit mapped to the normalized average PD limit, wherein the TX power limit TPL1 includes the first normalized average TX power limit and the second normalized average TX power limit. However, this is for illustration only, and the present invention is not limited thereto. In some embodiments, the user may directly utilize the test or the simulation to find the TX power limit TPL1. That is, the RF exposure limit may also be mapped to the TX power limit TPL1 of the radio module 108 directly by the user.

Similarly, the radio module 118 may be arranged to receive an RF exposure limit regulated by officials, wherein the RF exposure limit corresponds to the radio module 118. Since the RF exposure limit is proportional to a TX power of the radio module 118, the radio module 118 may be further arranged to map the RF exposure limit to a TX power limit TPL2 of the radio module 118. However this is for illustration only, and the present invention is not limited thereto. In some embodiments, the user may directly utilize the test or the simulation to find the TX power limit TPL2. That is, the RF exposure limit may also be mapped to the TX power limit TPL2 of the radio module 118 directly by the user.

Under a condition that the processing module 200 is implemented by the radio module 108, the processing module 200 may interact with the radio module 118 to receive at least one message M2 from the radio module 118, and adjust the TX power ratios TXR1 and TXR2 at least according to the at least one message M2 to obtain adjusted TX power ratios A_TXR1 and A_TXR2, respectively. For example, the processing module 200 may adjust the TX power ratios TXR1 and TXR2 according to only the at least one message M2 to obtain the adjusted TX power ratios A_TXR1 and A_TXR2, respectively. For another example, the processing module 200 may adjust the TX power ratios TXR1 and TXR2 according to both at least one message M1 that is calculated by the radio module 108 and the at least one message M2 to obtain the adjusted TX power ratios A_TXR1 and A_TXR2, respectively. It should be noted that in some embodiments, under a condition that the processing module 200 is not able to receive the at least one message M2 from the radio module 118 due to some reasons, the processing module 200 may adjust the TX power ratios TXR1 and TXR2 according to only the at least one message M1 to obtain the adjusted TX power ratios A_TXR1 and A_TXR2, respectively. In some embodiments, after the processing module 200 receives the at least one message M2 from the radio module 118 by interacting with the radio module 118, the at least one message M2 may be stored in a memory (not shown in FIG. 4), and the processing module 200 may adjust the TX power ratios TXR1 and TXR2 according to only the at least one message M1 to obtain the adjusted TX power ratios A_TXR1 and A_TXR2, respectively. These alternative designs all fall within the scope of the present invention. The radio module 108 may be arranged to adjust the TX power limit TPL1 according to the adjusted TX power ratio A_TXR1, to generate an adjusted TX power limit ATPL1 of the radio module 108.

In addition, under a condition that the processing module 200 is implemented by the radio module 118, the processing module 200 may interact with the radio module 108 to receive at least one message M1 from the radio module 108, and adjust the TX power ratios TXR1 and TXR2 at least according to the at least one message M1 to obtain the adjusted TX power ratios A_TXR1 and A_TXR2, respectively. For example, the processing module 200 may adjust the TX power ratios TXR1 and TXR2 according to only the at least one message M1 to obtain the adjusted TX power ratios A_TXR1 and A_TXR2, respectively. For another example, the processing module 200 may adjust the TX power ratios TXR1 and TXR2 according to both the at least one message M1 and the at least one message M2 that is calculated by the radio module 118 to obtain the adjusted TX power ratios A_TXR1 and A_TXR2, respectively. It should be noted that in some embodiments, under a condition that the processing module 200 is not able to receive the at least one message M1 from the radio module 108 due to some reasons, the processing module 200 may adjust the TX power ratios TXR1 and TXR2 according to only the at least one message M2 to obtain the adjusted TX power ratios A_TXR1 and A_TXR2, respectively. In some embodiments, after the processing module 200 receives the at least one message M1 from the radio module 108 by interacting with the radio module 108, the at least one message M1 may be stored in a memory (not shown in FIG. 4), and the processing module 200 may adjust the TX power ratios TXR1 and TXR2 according to only the at least one message M2 to obtain the adjusted TX power ratios A_TXR1 and A_TXR2, respectively. These alternative designs all fall within the scope of the present invention. The radio module 118 may be arranged to adjust the TX power limit TPL2 according to the adjusted TX power ratio A_TXR2, to generate an adjusted TX power limit ATPL2 of the radio module 118.

The at least one message M1 and the at least one message M2 may include an on/off status of the radio module 108 and an on/off status of the radio module 118, respectively, wherein the off status represents that corresponding radio module has not performed an TX operation for a period of time (e.g. the corresponding radio module is in a shut down mode, a flight mode, a sleep mode, a discontinuous transmission (DTX) mode, a call drop mode, or no SIM card mode), and the on status represents that the corresponding radio module is not in the off status. For example, when the corresponding radio module is not in the shut down mode, the flight mode, the sleep mode, the DTX mode, the call drop mode, or the no SIM card mode, the corresponding radio module is in the on status. In addition, each of the at least one message M1 and the at least one message M2 may further include some information of the corresponding radio module. By way of example, but not limitation, the information of the corresponding radio module may include a previous TX power ratio, a TX power ratio margin, one or more TX performance indices, one or more receiving (RX) performance indices, one or more weighting information (e.g. the weighting information WEIGHT_I), or one or more configurations.

The one or more TX performance indices may include at least one of a duty cycle of TX, an error vector magnitude (EVM) of TX, a target power, a throughput, a modulation and coding scheme (MCS), a block error rate (BLER), a resource block (RB), a transmission block size (TBS), and a TX packet error rate (TX PER). The one or more RX performance indices may include at least one of a duty cycle of RX, a modulation and coding scheme (MCS), a block error rate (BLER), a resource block (RB), a received signal strength indication (RSSI), a reference signal receiving power (RSRP), a signal to noise ratio (SNR), a signal-to-interference-plus-noise ratio (SINR), and an RX packet error rate (RX PER). The one or more configurations may be related to at least one of an antenna, a band, a beam, a technology, a sub-band, one or more exposure condition indices, a simultaneous transmitted state, an MCC, an MNC, a modulation, a bandwidth, an MPR, a path, a duty cycle, and a combination of the band and an SIM.

In detail, under a condition that the processing module 200 is implemented by the radio module 108, in the beginning, the processing module 200 may interact with the radio module 118 to receive the on/off status of the radio module 118 included in the at least one message M2. In response to the on/off status indicating that the radio module 118 is off, the processing module 200 may allocate at least a portion (e.g. part or all) of the TX power ratio TXR2 of the radio module 118 to the TX power ratio TXR1 of the radio module 108 with a margin remained for the radio module 118, to obtain the adjusted TX power ratios A_TXR1 and A_TXR2, wherein the margin may be dynamically calculated according to the at least one message M1 and/or the at least one message M2. In response to the on/off status indicating that the radio module 118 is on, the processing module 200 may interact with the radio module 118 to receive the information of the radio module 118 included in the at least one message M2, and dynamically adjust the TX power ratio TXR1 of the radio module 108 and the TX power ratio TXR2 of the radio module 118 according to the information of the radio module 118 and the information of the radio module 108 included in the at least one message M1 that is calculated by the radio module 108, to obtain the adjusted TX power ratios A_TXR1 and A_TXR2. For example, under a condition that the weighting information WEIGHT_I indicates that the predetermined fixed ratio for the radio module 118 is 0.4 and the actual used TX power ratio of the radio module 118 is 0.2, the TX power ratio margin of the radio module 118 is 0.2, and the processing module 200 may allocate the TX power ratio margin of the radio module 118 to the radio module 108, for dynamically adjusting the TX power ratios TXR1 and TXR2 to obtain the adjusted TX power ratios A_TXR1 and A_TXR2, respectively (e.g. increasing the TX power ratio TXR1 and correspondingly decreasing the TX power ratio TXR2 to obtain the adjusted TX power ratios A_TXR1 and A_TXR2, respectively). Afterwards, the radio module 108 may adjust the TX power limit TPL1 according to the adjusted TX power ratio A_TXR1, to generate the adjusted TX power limit ATPL1 of the radio module 108.

Similarly, under a condition that the processing module 200 is implemented by the radio module 118, in the beginning, the processing module 200 may interact with the radio module 108 to receive the on/off status of the radio module 108 included in the at least one message M1. In response to the on/off status indicating that the radio module 108 is off, the processing module 200 may allocate at least a portion (e.g. part or all) of the TX power ratio TXR1 of the radio module 108 to the TX power ratio TXR2 of the radio module 118 with a margin remained for the radio module 108, to obtain the adjusted TX power ratios A_TXR1 and A_TXR2, wherein the margin may be dynamically calculated according to the at least one message M1 and/or the at least one message M2. In response to the on/off status indicating that the radio module 108 is on, the processing module 200 may interact with the radio module 108 to receive the information of the radio module 108 included in the at least one message M1, and dynamically adjust the TX power ratio TXR1 of the radio module 108 and the TX power ratio TXR2 of the radio module 118 according to the information of the radio module 108 and the information of the radio module 118 included in the at least one message M2 that is calculated by the radio module 118, to obtain the adjusted TX power ratios A_TXR1 and A_TXR2, respectively. Afterwards, the radio module 118 may adjust the TX power limit TPL2 according to the adjusted TX power ratio A_TXR2, to generate the adjusted TX power limit ATPL2 of the radio module 118.

Figure 5:
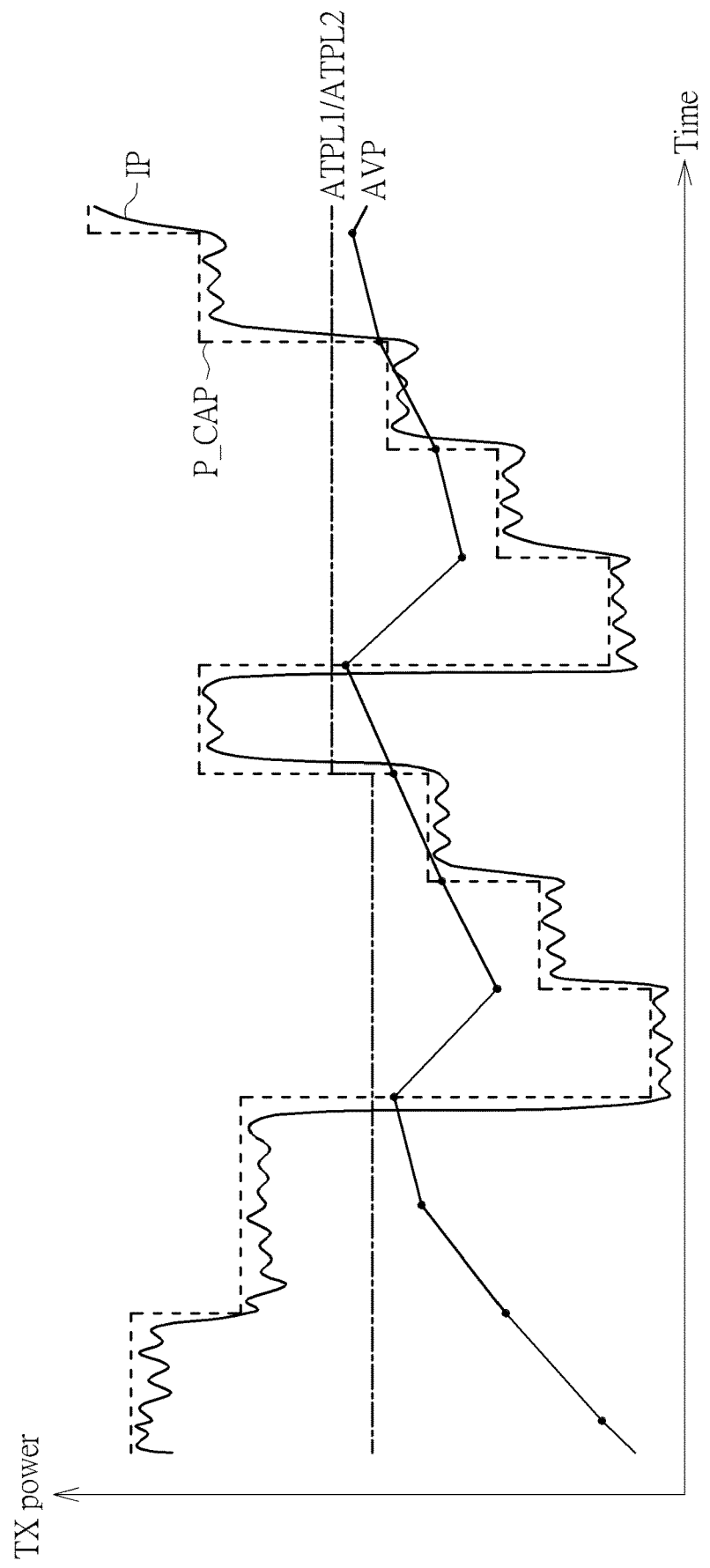
FIG. 5 is a diagram illustrating a control scheme of an instantaneous power of a radio module according to an embodiment of the present invention.

After generating the adjusted TX power limit ATPL1, the radio module 108 may control an instantaneous power IP of the radio module 108 to make an average power AVP of the radio module 108 lower than or equal to the adjusted TX power limit ATPL1. Similarly, after generating the adjusted TX power limit ATPL2, the radio module 118 may control an instantaneous power IP of the radio module 118 to make an average power AVP of the radio module 118 lower than or equal to the adjusted TX power limit ATPL2. Specifically, please refer to FIG. FIG. 5 is a diagram illustrating a control scheme of the instantaneous power of the radio module 108/118 according to an embodiment of the present invention, wherein the horizontal axis of the diagram represents time, and the vertical axis of the diagram represents TX power of the radio module 108/118. As shown in FIG. in order to comply with regulations of the RF exposure limit, the radio module 108/118 may be arranged to control the instantaneous power IP of the radio module 108/118 to be capped below a power cap P CAP, to make the average power AVP of the radio module 108/118 lower than or equal to the adjusted TX power limit ATPL1/ATPL2. Since operations of the power cap P CAP are well known to those with ordinary knowledge in the art, and the focus of the present invention is on the radio group separation and dynamic adjustment for the TX power ratio TXR1/TXR2 of the radio module 108/118 in the same radio group G1, the details of the operations of the power cap P CAP will be omitted for brevity.

After the average power AVP of the radio module 108 is controlled to be lower than or equal to the adjusted TX power limit ATPL1 of the radio module 108, the radio module 108 may be further arranged to calculate the at least one message M1 of the radio module 108, for interacting with the radio module 118. For example, the radio module 108 may calculate the previous TX power ratio, the TX power ratio margin, the one or more TX performance indices, the one or more RX performance indices, the one or more weighting information, or the one or more configurations. Similarly, after the average power AVP of the radio module 118 is controlled to be lower than or equal to the adjusted TX power limit ATPL2 of the radio module 118, the radio module 118 may be further arranged to calculate the at least one message M2 of the radio module 118, for interacting with the radio module 108. For brevity, similar descriptions for this embodiment are omitted.

Figure 6:
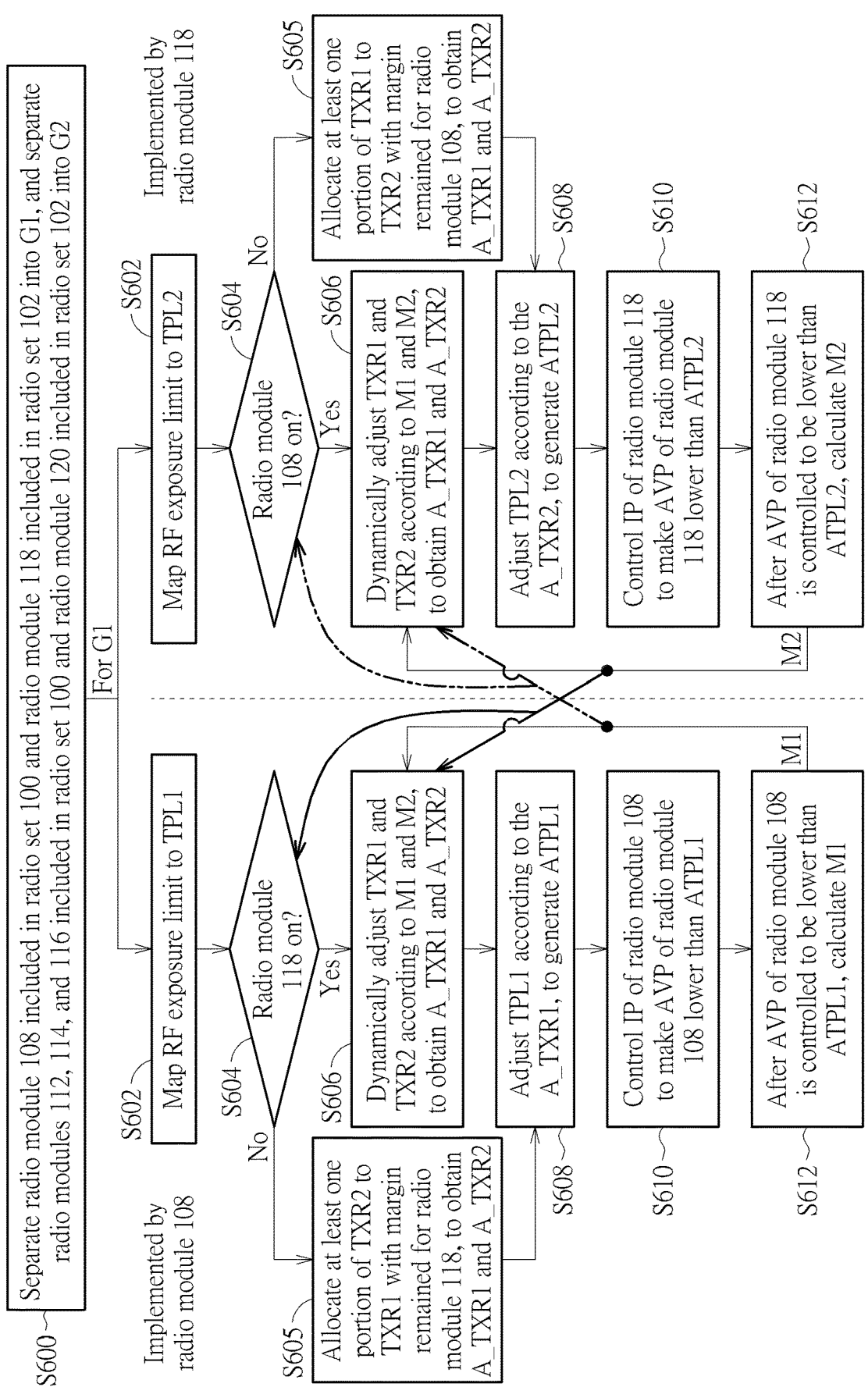
FIG. 6 is a flow chart of a method for adjusting a TX power ratio of a radio module according to an embodiment of the present invention.

FIG. 6 is a flow chart of a method for adjusting a TX power ratio of a radio module according to an embodiment of the present invention. Provided that the result is substantially the same, the steps are not required to be executed in the exact order shown in FIG. 6. For example, regarding the separation of the radio sets 100 and 102 and the adjustment of TX power ratios TXR1 and TXR2 of the radio modules 108 and 118 included in the same radio group G1, the method shown in FIG. 6 may be employed by the radio system 12 (more particularly, the processing circuit 106) shown in FIG. 1 and the radio module 108, the radio module 118, and the processing module 200 shown in FIG. 4.

In Step S600, the radio sets 100 and 102 are separated into the radio groups G1 and G2 according to the regulations of the SPLSR, and more particularly, the radio module 108 included in the radio set 100 and the radio module 118 included in the radio set 102 are separated into the radio group G1, and the radio modules 112, 114, and 116 in the radio set 100 and the radio module 120 in the radio set 102 are separated into the radio group G2.

In Step S602, the radio module 108 maps the RF exposure limit corresponding to the radio module 108 to the TX power limit TPL1. Similarly, the radio module 118 maps the RF exposure limit corresponding to the radio module 118 to the TX power limit TPL2.

In Step S604, when the processing module 200 is implemented by the radio module 108, the on/off status of the radio module 118 included in the at least one message M2 is received by interacting with the radio module 118. Afterwards, it is determined that whether the on/off status indicates that the radio module 118 is on. If yes, Step S606 is entered; if no, Step S605 is entered. In addition, when the processing module 200 is implemented by the radio module 118, the on/off status of the radio module 108 included in the at least one message M1 is received by interacting with the radio module 108. Afterwards, it is determined that whether the on/off status indicates that the radio module 108 is on. If yes, Step S606 is entered; if no, Step S605 is entered.

In Step S605, when the processing module 200 is implemented by the radio module 108, in response to the on/off status indicating that the radio module 118 is off, at least a portion (e.g. part or all) of the TX power ratio TXR2 of the radio module 118 may be allocated to the TX power ratio TXR1 of the radio module 108 with a margin remained for the radio module 118, to obtain the adjusted TX power ratios A_TXR1 and A_TXR2. In addition, when the processing module 200 is implemented by the radio module 118, in response to the on/off status indicating that the radio module 108 is off, at least a portion (e.g. part or all) of the TX power ratio TXR1 of the radio module 108 may be allocated to the TX power ratio TXR2 of the radio module 118 with a margin remained for the radio module 108, to obtain the adjusted TX power ratios A_TXR1 and A_TXR2.

In Step S606, when the processing module 200 is implemented by the radio module 108, in response to the on/off status indicating that the radio module 118 is on, the information of the radio module 118 included in the at least one message M2 is received by interacting with the radio module 118, and the TX power ratio TXR1 of the radio module 108 and the TX power ratio TXR2 of the radio module 118 are dynamically adjusted according to the information of the radio module 118 and the information of the radio module 108 included in the at least one message M1, to obtain the adjusted TX power ratios A_TXR1 and A_TXR2, respectively. In addition, when the processing module 200 is implemented by the radio module 118, in response to the on/off status indicating that the radio module 108 is on, the information of the radio module 108 included in the at least one message M1 is received by interacting with the radio module 108, and the TX power ratio TXR1 of the radio module 108 and the TX power ratio TXR2 of the radio module 118 are dynamically adjusted according to the information of the radio module 108 and the information of the radio module 118 included in the at least one message M2, to obtain the adjusted TX power ratios A_TXR1 and A_TXR2, respectively.

In Step S608, the radio module 108 adjusts the TX power limit TPL1 according to the adjusted TX power ratio A_TXR1, to generate the adjusted TX power limit ATPL1. Similarly, the radio module 118 adjusts the TX power limit TPL2 according to the adjusted TX power ratio A_TXR2, to generate the adjusted TX power limit ATPL2.

In Step S610, the radio module 108 controls the instantaneous power IP of the radio module 108 to make the average power AVP of the radio module 108 lower than or equal to the adjusted TX power limit ATPL1. Similarly, the radio module 118 controls the instantaneous power IP of the radio module 118 to make the average power AVP of the radio module 118 lower than or equal to the adjusted TX power limit ATPL2.

In Step S612, after the average power AVP of the radio module 108 is controlled to be lower than or equal to the adjusted TX power limit ATPL1, the radio module 108 calculates the at least one message M1 for interacting with the radio module 118. Similarly, after the average power AVP of the radio module 118 is controlled to be lower than or equal to the adjusted TX power limit ATPL2, the radio module 118 calculates the at least one message M2 for interacting with the radio module 108.

Since a person skilled in the pertinent art can readily understand details of the steps after reading above paragraphs directed to the processing circuit 106 shown in FIG. 1 and the radio module 108, the radio module 118, and the processing module 200 shown in FIG. 4, and the adjustment of the TX power ratios of the radio modules 112, 114, 116, and 120 included in the radio group G2 is similar to that of the radio modules 108 and 118 included in the radio group G1, further descriptions are omitted here for brevity.

In summary, by the method of the present invention and an associated radio system, multiple radio modules are separated into multiple radio groups according to an RF regulation related to the SPLSR for calculating respective TER of the radio groups, which can make the radio groups easy to comply with the TER regulation, and therefore can increase design flexibility. In addition, for each radio group, in the beginning, under a condition that any of the radio modules in the radio group only needs a TX power ratio less than a predetermined fixed ratio (i.e. one radio module will have a TX power margin remained unused), the others of the radio modules in the radio group may be able to utilize the TX power margin for dynamically adjusting the TX power ratios of the others of the multiple radio modules and the TX power ratio of the any of the multiple radio modules (e.g. increasing the TX power ratios of the others of the multiple radio modules and correspondingly decreasing the TX power ratio of the any of the multiple radio modules). Afterwards, under a condition that the any of multiple radio modules still only needs a current TX power ratio less than a previous adjusted TX power ratio (i.e. the one radio module will still have the TX power margin remained unused), the others of the multiple radio modules may be able to utilize the TX power margin for further dynamic adjustment. In this way, ratio efficiency and performance can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting a transmitting (TX) power ratio of a radio module, comprising:
    separating multiple radio modules into multiple radio groups according to a radiofrequency (RF) regulation, wherein the multiple radio modules comprise the radio module;
    mapping an RF exposure limit to a TX power limit;
    interacting with at least one other radio module for adjusting the TX power ratio, to obtain at least one adjusted TX power ratio, wherein the multiple radio modules comprise the at least one other radio module, and the radio module and the at least one other radio module are comprised in a same radio group of the multiple radio groups; and
    adjusting the TX power limit according to the at least one adjusted TX power ratio, to generate an adjusted TX power limit of the radio module.

2. The method of claim 1, wherein the RF regulation is related to a specific absorption rate to peak location separation ratio (SPLSR), and a total exposure ratio (TER) calculation of each of the multiple radio groups is independent.

3. The method of claim 1, wherein the step of interacting with the at least one other radio module for adjusting the TX power ratio, to obtain the at least one adjusted TX power ratio comprises:

receiving at least one message of the at least one other radio module; and adjusting the TX power ratio at least according to the at least one message of the at least one other radio module, to obtain the at least one adjusted TX power ratio.

4. The method of claim 3, wherein the at least one message of the at least one other radio module comprises an on/off status of the at least one other radio module.

5. The method of claim 4, wherein the step of adjusting the TX power ratio at least according to the at least one message of the at least one other radio module, to obtain the at least one adjusted TX power ratio comprises:

in response to the on/off status indicating that the at least one other radio module is off, allocating a TX power ratio of the at least one other radio module to the radio module with a margin remained for the at least one other radio module.

6. The method of claim 4, wherein the step of adjusting the TX power ratio at least according to the at least one message of the at least one other radio module, to obtain the at least one adjusted TX power ratio comprises:

in response to the on/off status indicating that the at least one other radio module is on, dynamically adjusting the TX power ratio according to the at least one message of the at least one other radio module and at least one message of the radio module.

7. The method of claim 6, wherein each of the at least one message of the at least one other radio module and the at least one message of the radio module comprises a previous TX power ratio, a TX power ratio margin, one or more TX performance indices, one or more receiving (RX) performance indices, one or more weighting information, or one or more configurations.

8. The method of claim 6, wherein each of the at least one message of the at least one other radio module and the at least one message of the radio module comprises the one or more TX performance indices, including at least one of a duty cycle of TX, an error vector magnitude (EVM) of TX, a target power, a throughput, a modulation and coding scheme (MCS), a block error rate (BLER), a resource block (RB), a transmission block size (TBS), and a TX packet error rate (TX PER).

9. The method of claim 6, wherein each of the at least one message of the at least one other radio module and the at least one message of the radio module comprises the one or more RX performance indices, including at least one of a duty cycle of RX, a modulation and coding scheme (MCS), a block error rate (BLER), a resource block (RB), a received signal strength indication (RSSI), a reference signal RX power (RSRP), a signal to noise ratio (SNR), a signal to interference plus noise ratio (SINR), and an RX packet error rate (RX PER).

10. The method of claim 6, wherein each of the at least one message of the at least one other radio module and the at least one message of the radio module comprises the one or more configurations related to at least one of an antenna, a band, a beam, a technology, a sub-band, one or more exposure condition indices, a simultaneous transmitted state, a mobile country code (MCC), a mobile network code (MNC), a modulation, a bandwidth, a maximum power reduction (MPR), a path, a duty cycle, and a combination of the band and a subscriber identity module (SIM).

11. The method of claim 1, further comprising:

controlling an instantaneous power to make an average power lower than or equal to the adjusted TX power limit.

12. The method of claim 1, further comprising:

calculating at least one message of the radio module, for interacting with the at least one other radio module.

13. The method of claim 1, further comprising:

for each of the multiple radio groups, in response to one or more configurations corresponding to said each of the multiple radio groups being activated, starting to activate a time tick corresponding to said each of the multiple radio groups for calculating a total exposure ratio (TER).

14. The method of claim 13, wherein the one or more configurations are related to a band of said each of the multiple radio groups.

15. The method of claim 13, further comprising:

in response to the one or more configurations corresponding to said each of the multiple radio groups being inactivated for at least a period of time, starting to inactivate the time tick corresponding to said each of the multiple radio groups.

16. A radio system for adjusting a transmitting (TX) power ratio of a radio module, comprising:

a processing circuit, arranged to separate multiple radio modules into multiple radio groups according to a radiofrequency (RF) regulation, wherein the multiple radio modules comprise the radio module; and the radio module, arranged to:

map an RF exposure limit to a TX power limit;

interact with at least one other radio module for adjusting the TX power ratio, to obtain at least one adjusted TX power ratio, wherein the radio module and the at least one other radio module are comprised in a same radio group of the multiple radio groups; and adjust the TX power limit according to the at least one adjusted TX power ratio, to generate an adjusted TX power limit of the radio module.

17. The radio system of claim 16, wherein the RF regulation is related to a specific absorption rate to peak location separation ratio (SPLSR), and a total exposure ratio (TER) calculation of each of the multiple radio groups is independent.

18. The radio system of claim 16, wherein the radio module is further arranged to receive at least one message of the at least one other radio module, and adjust the TX power ratio at least according to the at least one message of the at least one other radio module, to obtain the at least one adjusted TX power ratio.

19. The radio system of claim 18, wherein the at least one message of the at least one other radio module comprises an on/off status of the at least one radio module.

20. The radio system of claim 19, wherein in response to the on/off status indicating that the at least one other radio module is off, the radio module allocates a TX power ratio of the at least one other radio module to the radio module with a margin remained for the at least one other radio module.

21. The radio system of claim 19, wherein in response to the on/off status indicating that the at least one other radio module is on, the radio module dynamically adjusts the TX power ratio according to the at least one message of the at least one other radio module and at least one message of the radio module.

22. The radio system of claim 21, wherein each of the at least one message of the at least one other radio module and the at least one message of the radio module comprises a previous TX power ratio, a TX power ratio margin, one or more TX performance indices, one or more receiving (RX) performance indices, one or more weighting information, or one or more configurations.

23. The radio system of claim 22, wherein each of the at least one message of the at least one other radio module and the at least one message of the radio module comprises the one or more TX performance indices, including at least one of a duty cycle of TX, an error vector magnitude (EVM) of TX, a target power, a throughput, a modulation and coding scheme (MCS), a block error rate (BLER), a resource block (RB), a transmission block size (TBS), and a TX packet error rate (TX PER).

24. The radio system of claim 22, wherein each of the at least one message of the at least one other radio module and the at least one message of the radio module comprises the one or more RX performance indices, including at least one of a duty cycle of RX, a modulation and coding scheme (MCS), a block error rate (BLER), a resource block (RB), a received signal strength indication (RSSI), a reference signal RX power (RSRP), a signal to noise ratio (SNR), a signal to interference plus noise ratio (SINR), and an RX packet error rate (RX PER).

25. The radio system of claim 22, wherein each of the at least one message of the at least one other radio module and the at least one message of the radio module comprises the one or more configurations related to at least one of an antenna, a band, a beam, a technology, a sub-band, one or more exposure condition indices, a simultaneous transmitted state, a mobile country code (MCC), a mobile network code (MNC), a modulation, a bandwidth, a maximum power reduction (MPR), a path, a duty cycle, and a combination of the band and a subscriber identity module (SIM).

26. The radio system of claim 16, wherein the radio module is further arranged to control an instantaneous power to make an average power lower than or equal to the adjusted TX power limit.

27. The radio system of claim 16, wherein the radio module is further arranged to calculate at least one message of the radio module, for interacting with the at least one other radio module.

28. The radio system of claim 16, wherein for each of the multiple radio groups, in response to one or more configurations corresponding to said each of the multiple radio groups being activated, the processing circuit is further arranged to start to activate a time tick corresponding to said each of the multiple radio groups for calculating a total exposure ratio (TER).

29. The radio system of claim 28, wherein the one or more configurations are related to a band of said each of the multiple radio groups.

30. The radio system of claim 28, wherein in response to the one or more configurations corresponding to said each of the multiple radio groups being inactivated for at least a period of time, the processing circuit is further arranged to start to inactivate the time tick corresponding to said each of the multiple radio groups.

* * * * *